(12) United States Patent
Lube

(10) Patent No.: US 7,401,809 B2
(45) Date of Patent: Jul. 22, 2008

(54) AIRBAG DEVICE

(75) Inventor: Thomas Lube, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 11/417,209

(22) Filed: May 4, 2006

(65) Prior Publication Data

US 2006/0267320 A1    Nov. 30, 2006

Related U.S. Application Data

(63) Continuation of application No. PCT/DE2004/002786, filed on Dec. 16, 2004.

(30) Foreign Application Priority Data

Dec. 19, 2003  (DE) ............................... 103 61 887

(51) Int. Cl.
*B60R 21/276* (2006.01)
(52) U.S. Cl. ..................... 280/739; 280/742
(58) Field of Classification Search ................ 280/735, 280/736, 739, 742
See application file for complete search history.

(56) References Cited

U.S. PATENT DOCUMENTS

| | | | | |
|---|---|---|---|---|
| RE33,938 E | * | 5/1992 | Cuevas ........................ | 280/731 |
| 5,243,492 A | * | 9/1993 | Marquit et al. ............... | 361/247 |
| 5,366,242 A | * | 11/1994 | Faigle et al. ................. | 280/736 |
| 5,441,302 A | * | 8/1995 | Johnson et al. .............. | 280/736 |
| 5,630,723 A | * | 5/1997 | Kawamoto ................... | 439/164 |
| 5,743,558 A | * | 4/1998 | Seymour ...................... | 280/739 |
| 5,752,844 A | * | 5/1998 | Kawamoto ................... | 439/164 |
| 5,839,754 A | * | 11/1998 | Schluter et al. .............. | 280/736 |
| 6,017,056 A | * | 1/2000 | Lee .............................. | 280/739 |
| 6,039,346 A | * | 3/2000 | Ryan et al. ................... | 280/736 |
| 6,065,773 A | * | 5/2000 | Klinger et al. ............... | 280/736 |
| 6,142,519 A | * | 11/2000 | Smith .......................... | 280/741 |
| 6,145,878 A | | 11/2000 | Weikl | |
| 6,199,895 B1 | * | 3/2001 | Seymour ................... | 280/728.2 |
| 6,213,502 B1 | * | 4/2001 | Ryan et al. ................... | 280/736 |
| 6,227,567 B1 | | 5/2001 | Ross | |
| 6,279,949 B1 | | 8/2001 | Braunschädel | |
| 6,364,342 B1 | * | 4/2002 | Kim ......................... | 280/728.2 |
| 6,439,603 B2 | | 8/2002 | Damman et al. | |
| 6,497,431 B1 | * | 12/2002 | Schramm ..................... | 280/736 |
| 6,517,105 B1 | * | 2/2003 | Ford ............................ | 280/731 |
| 6,547,274 B2 | * | 4/2003 | Ochiai ......................... | 280/735 |
| 6,572,140 B2 | * | 6/2003 | Specht et al. ............... | 280/736 |
| 6,626,463 B1 | * | 9/2003 | Arima et al. ................. | 280/806 |

(Continued)

FOREIGN PATENT DOCUMENTS

DE    0 945 314 A2    9/1999

(Continued)

*Primary Examiner*—Eric Culbreth
*Assistant Examiner*—Karen Jane J. Amores
(74) *Attorney, Agent, or Firm*—Foley & Lardner LLP

(57) ABSTRACT

An airbag module for a motor vehicle comprises an inflatable gas bag; a gas generator for inflating the gas bag; a valve for letting gas out of the gas bag; a moveable actuating element for the valve, which can be actuated in order to open the valve; and a trigger mechanism which is used to actuate the actuating element by producing pressure. The trigger mechanism releases a compressed gas in order to actuate the actuating element, the gas directly acting upon a pressure attach surface of the actuating element.

9 Claims, 7 Drawing Sheets

U.S. PATENT DOCUMENTS

| | | | |
|---|---|---|---|
| 6,752,420 B2* | 6/2004 | Ziolo et al. | 280/739 |
| 6,899,134 B2* | 5/2005 | Breed et al. | 137/625.31 |
| 7,073,819 B2* | 7/2006 | Castagner et al. | 280/736 |
| 7,104,821 B2* | 9/2006 | Araki et al. | 439/164 |
| 7,240,917 B2* | 7/2007 | Fogle et al. | 280/739 |
| 2001/0038201 A1 | 11/2001 | Ryan | |
| 2002/0125059 A1* | 9/2002 | Zeller et al. | 180/282 |
| 2003/0025309 A1* | 2/2003 | Schenck et al. | 280/735 |
| 2003/0107207 A1* | 6/2003 | Elqadah et al. | 280/735 |
| 2004/0051283 A1* | 3/2004 | Parizat et al. | 280/736 |
| 2004/0094940 A1* | 5/2004 | Hawthorn et al. | 280/736 |
| 2004/0155442 A1* | 8/2004 | Ford et al. | 280/739 |
| 2004/0169359 A1* | 9/2004 | Isakov et al. | 280/736 |
| 2004/0239087 A1* | 12/2004 | Rink et al. | 280/736 |
| 2005/0017489 A1* | 1/2005 | Huperz | 280/736 |
| 2005/0023811 A1* | 2/2005 | Thomas | 280/736 |
| 2005/0029786 A1* | 2/2005 | Watase et al. | 280/740 |
| 2005/0082803 A1* | 4/2005 | Teramoto et al. | 280/736 |
| 2005/0248137 A1* | 11/2005 | Delventhal et al. | 280/739 |
| 2006/0103123 A1* | 5/2006 | Myers | 280/736 |
| 2006/0244247 A1* | 11/2006 | Debler et al. | 280/739 |
| 2006/0267320 A1* | 11/2006 | Lube | 280/735 |
| 2007/0046006 A1* | 3/2007 | Katsuda et al. | 280/740 |

FOREIGN PATENT DOCUMENTS

| | | |
|---|---|---|
| DE | 198 10 537 A1 | 9/1999 |
| DE | 299 07 607 U1 | 11/1999 |
| DE | 198 39 283 A1 | 3/2000 |
| EP | 1 279 574 A1 | 1/2003 |
| GB | 2 306 409 A | 5/1997 |
| WO | WO 98/31570 A1 | 7/1998 |
| WO | WO 00/30901 A1 | 6/2000 |

* cited by examiner

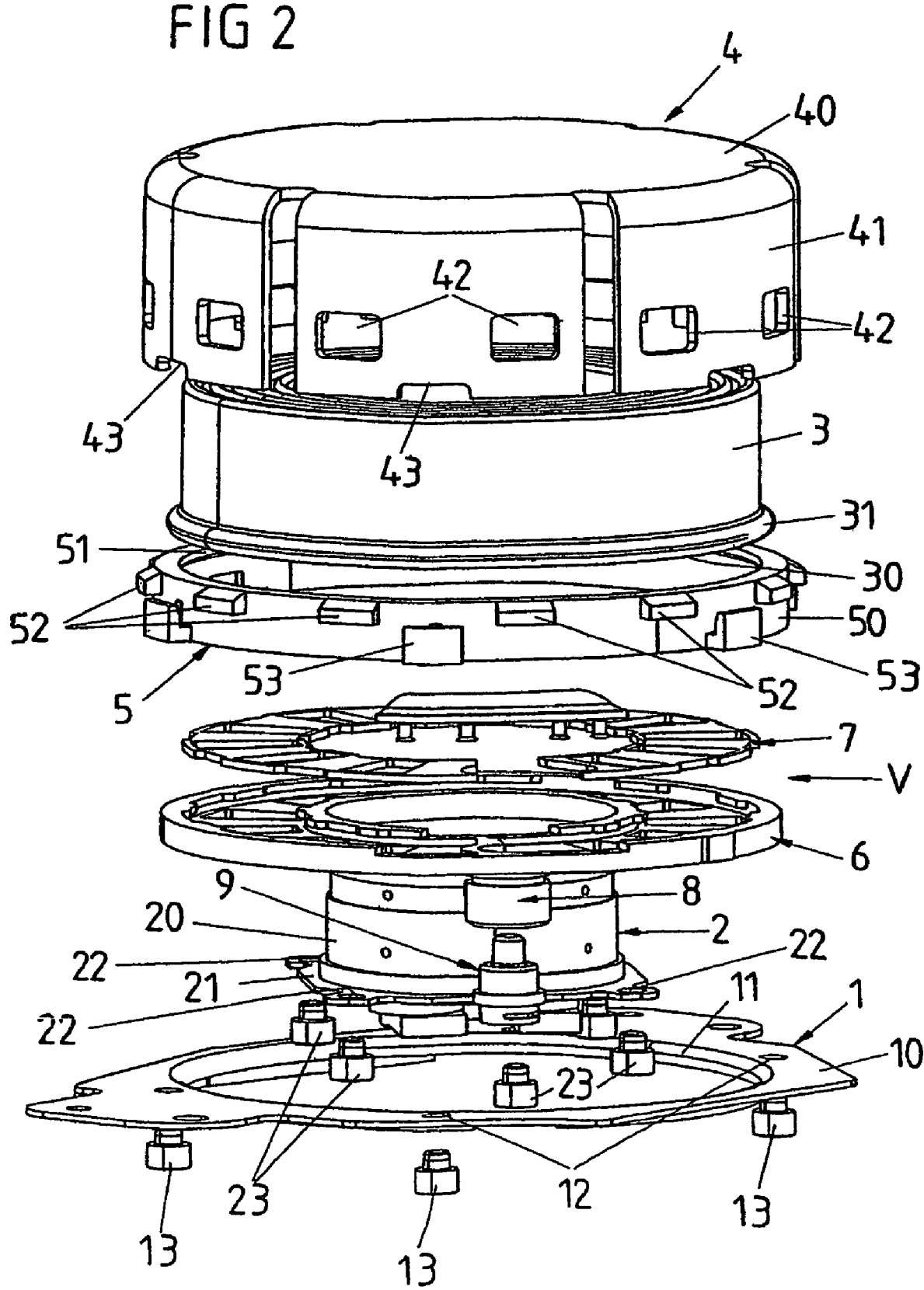

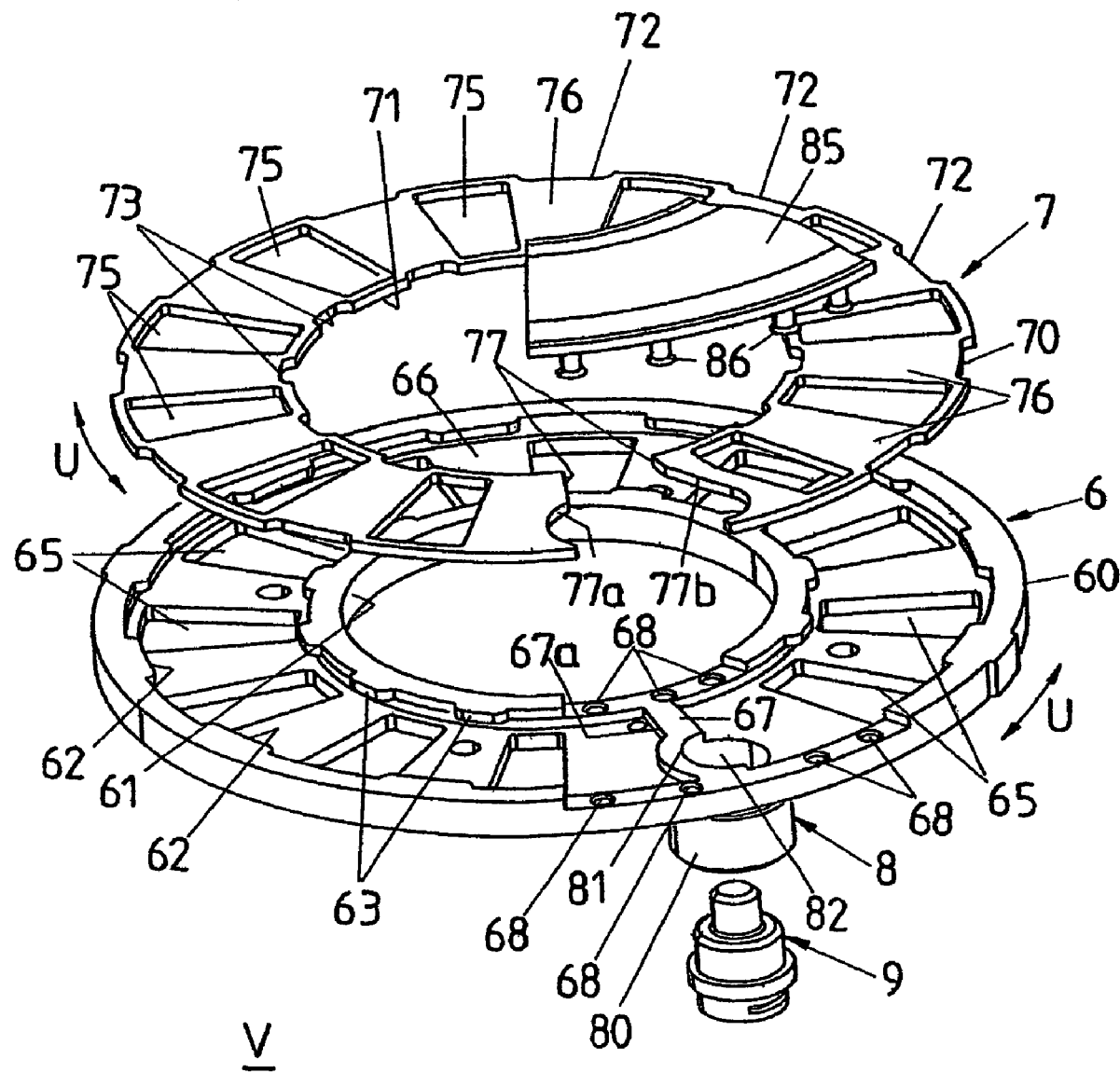

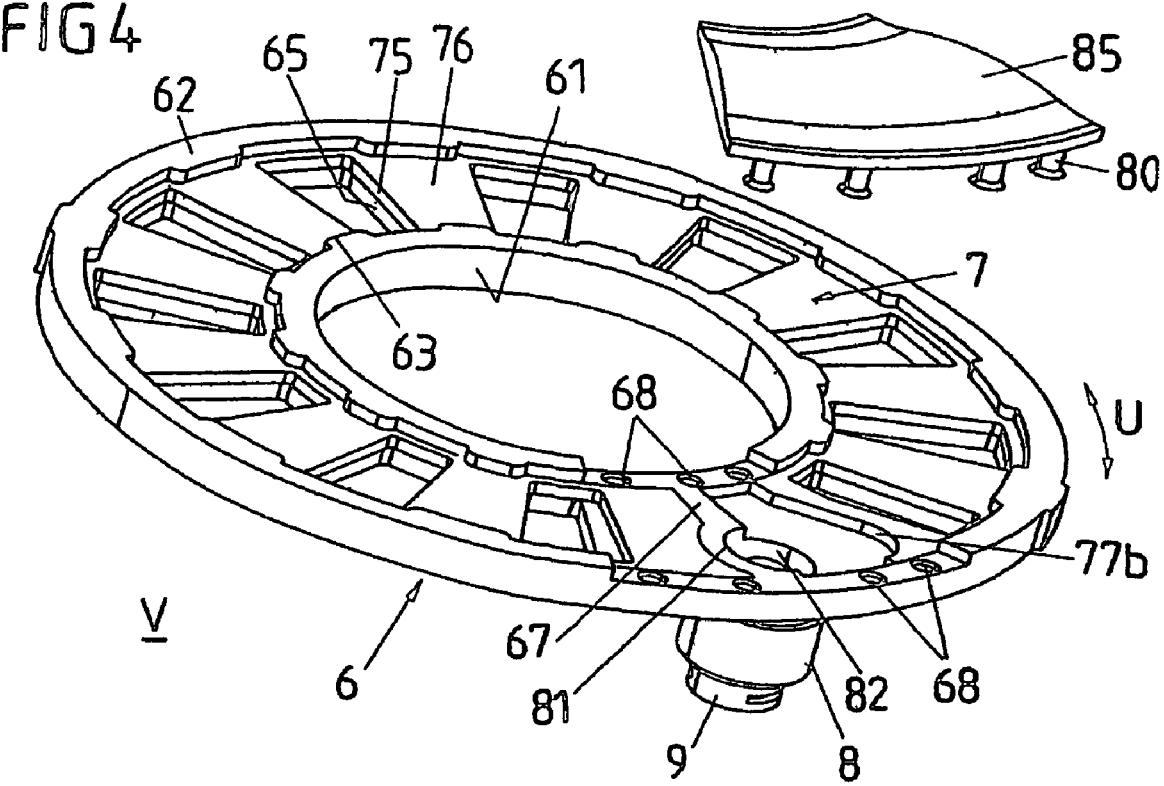
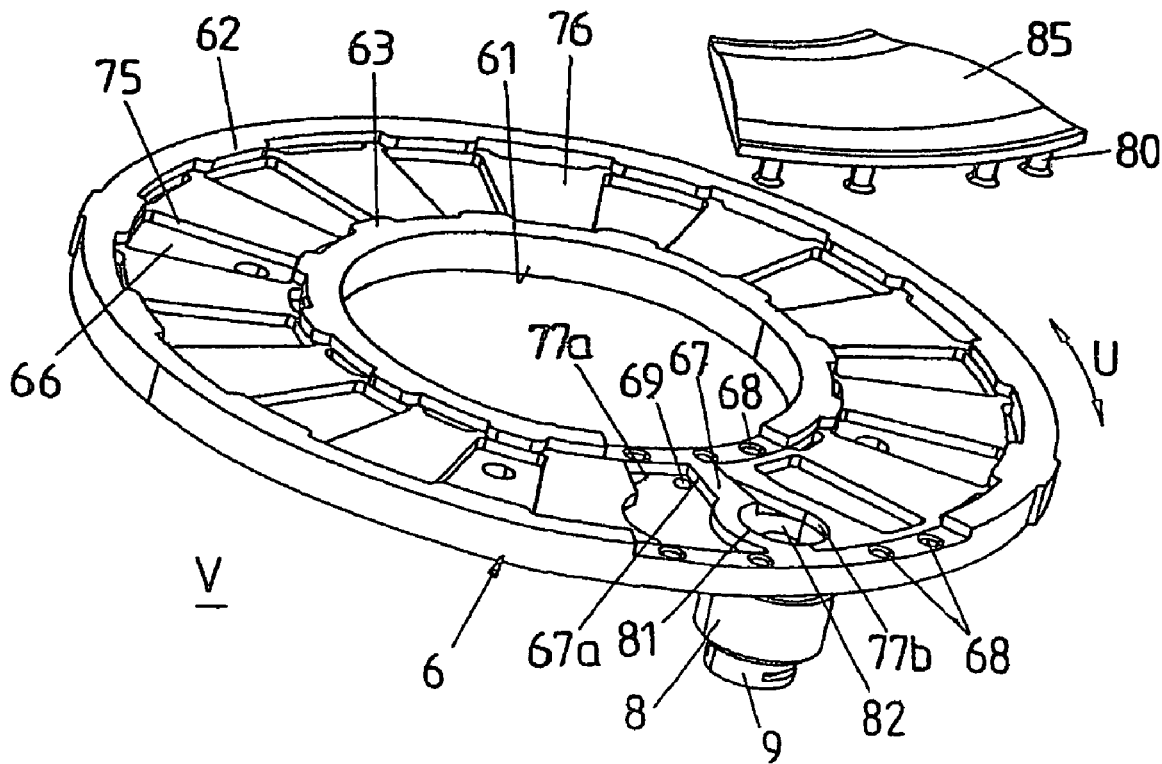

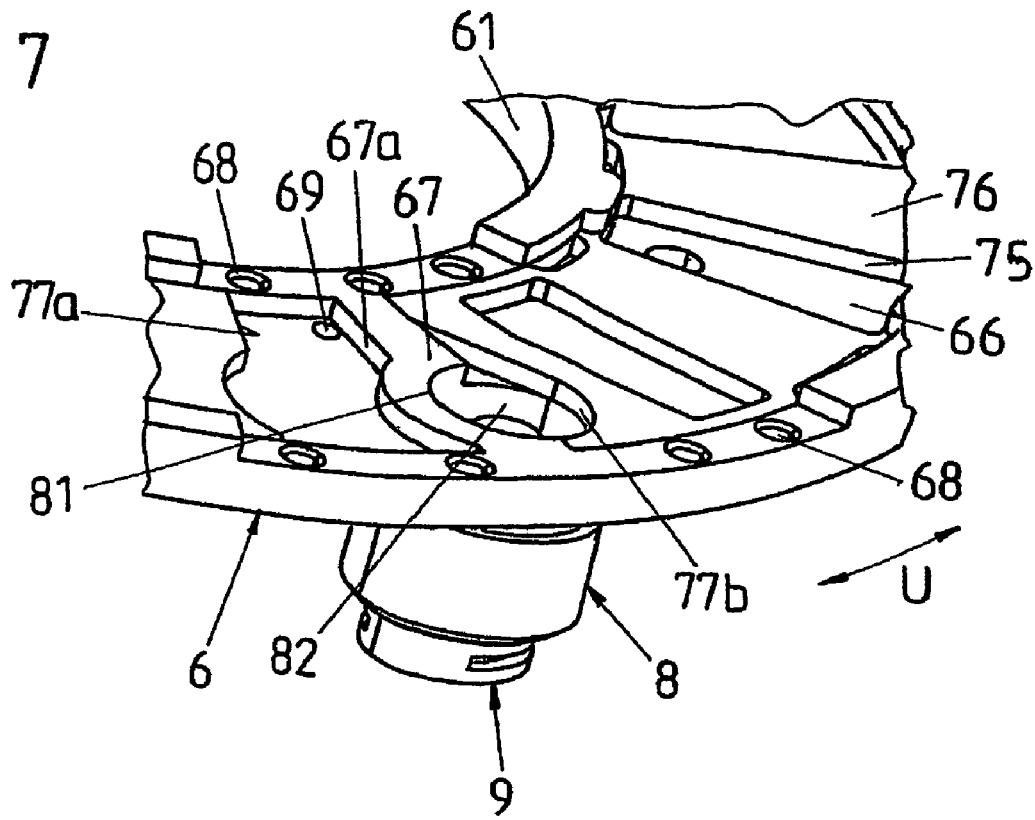
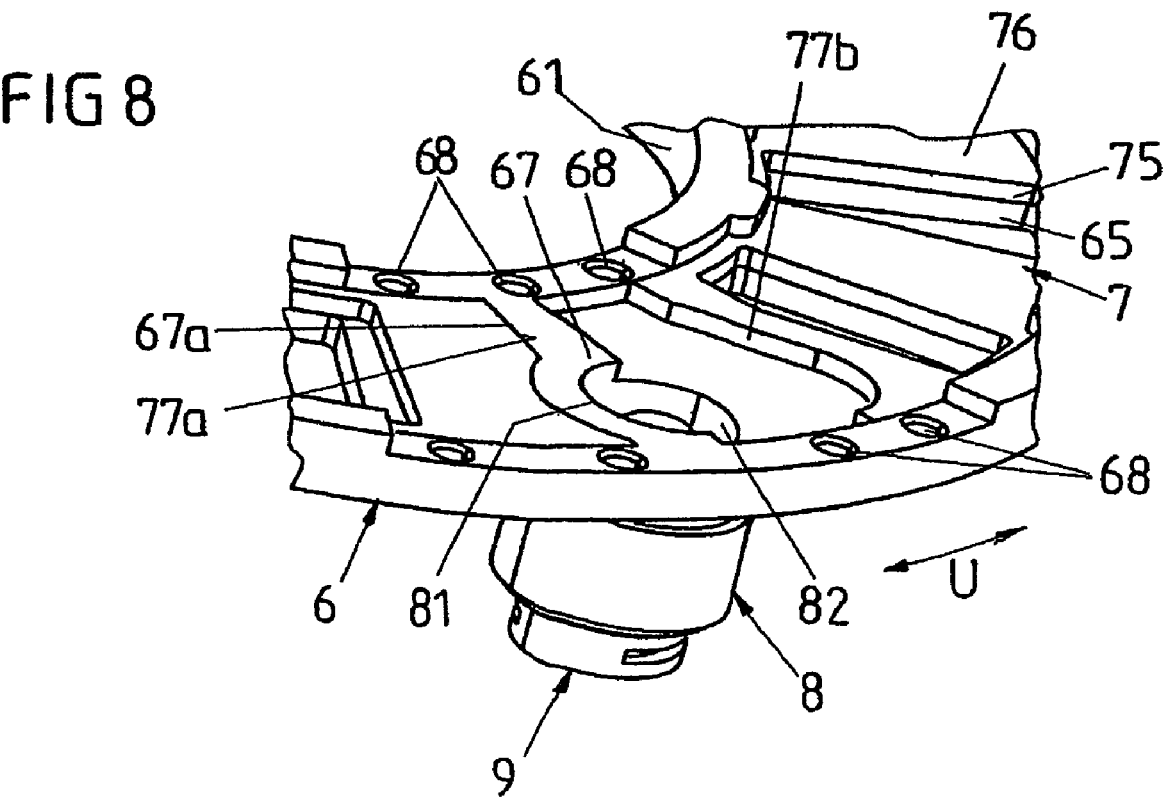

AIRBAG DEVICE

CROSS REFERENCE TO RELATED APPLICATIONS

This is a continuation of International Application PCT/DE2004/002786, which has an international filing date of Dec. 16, 2004; this International Application was not published in English, but was published in German as WO 2005/058654.

BACKGROUND

The invention relates to an airbag device for a motor vehicle.

An airbag device of this type comprises an inflatable gas bag; a gas generator for inflating the gas bag; a valve for letting gas out of the (at least partially inflated) gas bag; a moveable actuating element of the valve, which can be actuated in order to open the valve, so that gas can be let out of the gas bag; and a triggering mechanism for actuating the actuating element (to open the valve) by generating pressure.

The inflation of the gas bag by the associated gas generator takes place in the event of a crash in order to reduce the risk of injury to a vehicle occupant. Depending on certain parameters, such as, for example, the size of the vehicle occupant to be protected, the position of the vehicle occupant at the instant of an accident, the relative speed between the occupant and the vehicle as a consequence of an accident and the like, a reduction in the internal pressure of the gas bag compared with the pressure which can be achieved upon full inflation of the gas bag by mechanism of the associated gas generator may be advantageous in order to protect the particular vehicle occupant.

In order to reduce the internal pressure of the gas bag, controlled as a function of the abovementioned parameters, the use of valve arrangements is known, with which gas can be let out of the gas bag to be inflated in a direction away from the vehicle occupant to be protected and can be diverted into a region behind or under the particular airbag module. Contact of the particular vehicle occupant with the possibly hot gases discharging from the gas bag is to be avoided here. The valve arrangement can be opened even before the gas generator is activated, in order right at the beginning of the inflation of the gas bag to provide discharge openings through which gases emerging from the gas generator can flow. By this mechanism, the pressure generated in the gas bag by mechanism of the gas generator is reduced from the beginning. Control of the valve arrangement in such a manner may be particularly advantageous, for example, if it is recognized, by mechanism of a sensor provided for this purpose (for example a weight sensor on a vehicle seat), that the vehicle occupant to be protected is a particularly small, light person.

In the case of an airbag device of the type mentioned at the beginning, which is known from GB 230 64 09 A (which is incorporated by reference herein in its entirety), the actuating element is designed as a rotatably mounted disk which, for actuating purposes, is assigned a pyrotechnically triggerable piston/cylinder unit (in the form of a tappet guided in a cylinder). The piston/cylinder unit in this case is arranged in the plane of the actuating element formed by a rotatable disk and, upon triggering, causes such a rotational movement of the actuating element that through openings provided on the actuating element are brought into overlap with outflow openings of an assigned valve basic body in order to permit the discharging of gas from the gas bag. However, there is the problem here that the space available for the outflow openings is reduced by the space required for the piston/cylinder unit. This is disadvantageous in particular in the case of driver airbag modules, since the modules generally only have a small cross section in the plane perpendicular to the desired gas outlet direction.

The previously described effects also apply to the airbag arrangement known from US Patent Publication No. 2003/0025309A1 (which is incorporated by reference herein in its entirety), in which an actuating element, formed by an annular disk, of a valve of an airbag arrangement is likewise actuated by a piston/cylinder unit.

SUMMARY

One embodiment of the invention relates to an airbag device for a motor vehicle. The airbag device comprises: an inflatable gas bag; a gas generator for inflating the gas bag; a valve for letting gas out of the gas bag; a basic body of the valve; a moveable actuating element of the valve, which can be actuated in order to open the valve; and a triggering mechanism for actuating the actuating element by generating pressure. A sensor-controlled, pyrotechnic unit serves as a triggering mechanism and releases a compressed gas in order to actuate the actuating element, the released compressed gas passing into a pressure space of the basic body of the valve, with, in the case of the pressure space, a boundary wall being at least partially formed by the pressure application surface of the actuating element and the compressed gas acting directly on a pressure application surface of the actuating element.

Another embodiment of the invention relates to an airbag device for a motor vehicle. The airbag device comprises: an inflatable gas bag; a gas generator for inflating the gas bag; a valve for letting gas out of the gas bag; a moveable actuating element of the valve, which can be actuated in order to open the valve; and a triggering mechanism for actuating the actuating element by generating pressure. The triggering mechanism for actuating the actuating element releases a compressed gas which acts directly on a pressure application surface of the actuating element.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 2 shows an exploded illustration of the airbag module from FIG. 1.

FIG. 3 shows an exploded illustration of the valve of the airbag arrangement from FIG. 1.

FIG. 4 shows a first step in the installation of the valve from FIG. 3.

FIG. 5 shows a second step in the installation of the valve from FIG. 3.

FIG. 7 shows a detail of the valve from FIG. 3 in a starting position, in which the valve is not opened in order to let out gas from the gas bag.

FIG. 8 shows a detail of the valve from FIG. 3 after an actuation, so that the valve is opened in order to let gas out of the gas bag.

DETAILED DESCRIPTION

Figure 1:
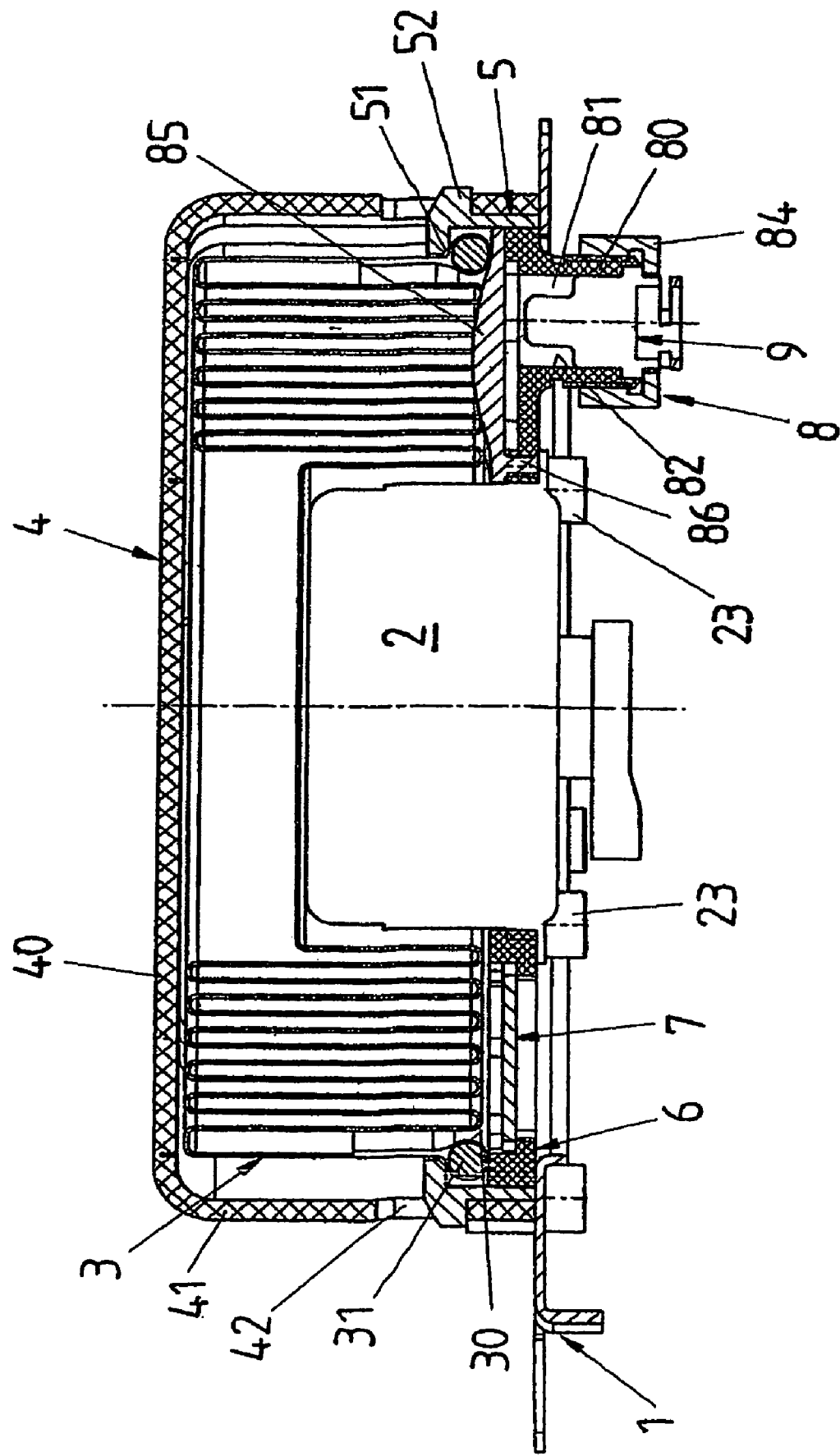
FIG. 1 shows a cross section through an airbag module with a gas bag, a gas generator for inflating the gas bag and a valve for letting gas out of the gas bag according to an embodiment of the invention.

Embodiments of the invention are therefore based on providing an airbag device which permits an enlargement of the outflow cross section for gas possibly to be let out.

According to embodiments, the triggering mechanism for actuating the actuating element of the valve releases a compressed gas which acts directly on a pressure application surface of the actuating element.

This triggering mechanism releases compressed gases that can act on an associated application surface of the actuating element (pressure application surface) without an additional functional unit comprising components which are moveable relative to one another by mechanism of the released compressed gases, such as, for example, a piston/cylinder unit, having to be actuated beforehand. Accordingly, the compressed gases released by the triggering mechanism act, according to embodiments of the invention, either on an application surface formed integrally on the actuating element or on a (separate) application surface connected fixedly thereto.

By this mechanism, the construction of the arrangement provided for actuating the actuating element is simplified and the space requirement is reduced, with the result that more space is available for the formation of discharge openings through which gas can be let out of the gas bag as a function of the values of certain parameters.

In this case, the valve can be provided either to form the sole discharge openings of the airbag device or further discharge openings, for example on the gas bag itself, may be provided in addition to the valve on the airbag device.

So that the compressed gases released by the triggering mechanism can act with a sufficiently large pressure on the actuating element, with the result that the actuating element executes a movement, owing to which the valve opens, the triggering mechanism is assigned a pressure space into which at least some of the released gases are conducted and in which at least part of a boundary wall is formed by the pressure application surface of the actuating element. In this pressure space, when the compressed gas originating from the triggering mechanism is released, a positive pressure builds up which acts on the pressure application surface of the moveably mounted actuating element and thereby causes a movement of the actuating element along the direction of action of the pressure (i.e. essentially perpendicularly to the pressure application surface). In order to form a sufficiently large pressure, the pressure space is closed on all sides in a gastight manner.

The valve comprises a valve basic body and an actuating element which is moveable in order to open the valve, which valve basic body and actuating element are each provided with through openings. These through openings are positioned with respect to one another so that they do not cover one another before the compressed gas is released by mechanism of the triggering mechanism and therefore do not permit gas to flow out of the gas bag into the surroundings. If, however, compressed gas is released by the triggering mechanism, in order to actuate the actuating element of the valve, then the actuating element moves into a position in which the through openings of the actuating element, on the one hand, and of the valve basic body, on the other hand, overlap each other, so that they act as discharge openings through which gas can emerge from the gas bag. The movement of the actuating element that is triggered by the action of the compressed gas, released by the triggering mechanism, on the pressure application surface of the actuating element is restricted here by two stops which can be brought into engagement with each other (for example, on the actuating element, on the one hand, and on the valve basic body, on the other hand) so that, when the mutually assigned stops come into engagement, the through openings of the actuating element, on the one hand, and of the valve basic body, on the other hand, precisely overlap.

According to an embodiment of the invention, the pressure space is formed on the valve basic body, so that its boundary walls are formed, on the one hand, by the valve basic body and, on the other hand, by the pressure application surface of the actuating element. In this case, the pressure space may be integrally formed on one side of the valve basic body or alternatively may be formed by a separate pressure container fastened to the valve basic body. Furthermore, an additional covering may be attachable in order to close the pressure space on the valve basic body.

The valve basic body and the actuating element are in each case of disk-shaped design, in particular in the form of annular disks, the actuating element being pivotable (rotatable) with respect to the valve basic body about an axis running perpendicularly to the plane of the disk.

In this case, the pressure application surface of the actuating element runs perpendicularly to the plane of extent of the disk-shaped basic body and of the disk-shaped actuating element itself, so that the compressive forces of the compressed gas released by the triggering mechanism, which compressive forces act on the pressure application surface, can generate a rotational movement of the actuating element about an axis running perpendicularly to its plane of extent. In this connection, the actuating element is advantageously guided on or in the valve basic body.

For simplified installation, the actuating element and the basic body have mutually assigned projections and indentations which engage in one another when installation is being carried out and thus permit, for example, the actuating element to be placed onto the valve basic body perpendicularly to the plane of extent of the two structural elements of disk-shaped design. After installation is finished, the projections, which are advantageously provided on the valve basic body and engage over the actuating element at the edge, can then serve as guide mechanism for guiding the actuating element on the valve basic body.

The actuating element preferably has an interruption in its disk-shaped body, which interruption is bounded, on the one hand, by the pressure application surface of the actuating element and, on the other hand, by the actuating-element stop restricting the movement of the actuating element. The size of this interruption (corresponding to the distance between the actuating-element stop and the pressure application surface) determines and restricts the extent of the possible movement of the actuating element relative to the valve basic body under the action of the compressed gases released by the triggering mechanism.

The triggering mechanism may be formed in a simple manner by a pyrotechnic unit which is triggered (before, during or after the inflation of the gas bag of the airbag device by mechanism of an associated gas generator) by an (electronic) control unit if certain parameters, such as, for example, the size of a vehicle occupant, the weight of a vehicle occupant, the position of a vehicle occupant etc., lie within a specifiable range of values.

The airbag device has a covering for closing a large opening through which the gas bag can deploy upon inflation, for example by tearing open or folding over the covering, and the valve is arranged on that side of the airbag device which lies opposite the covering, so that the gases originating from the gas bag to be inflated can emerge through the valve in a direction away from the occupant to be protected.

A retaining ring which serves for fixing the blow-in mouth of the gas bag can serve for fastening the gas bag to or in the airbag device. In order, if the need arises, to provide a maximum cross-sectional area which is as large as possible for gas to be let out of the gas bag, the blow-in mouth of the gas bag is to be fixed so that a large effective area for emerging gas is available. For this purpose, a reinforcing element, in particular in the form of a ring, can run along the edge of the blow-in mouth of the gas bag, which reinforcing element stabilizes the edge of the blow-in mouth in a specifiable annular shape, and which is engaged over by the retaining ring in order to fasten the gas bag to the airbag device.

The retaining ring in turn is fixed by a suitable fastening mechanism, for example in the form of screws, to a supporting subassembly of the airbag device, such as, for example, a support plate.

In addition to the fixing of the gas bag to the airbag device, the retaining ring may also serve to retain the valve, for example by the valve being accommodated between the retaining ring and that supporting subassembly of the airbag module to which the retaining ring is connected.

Furthermore, the covering, formed, for example, by a plastic cap, of the airbag device may be fixed to the retaining ring by form-fitting elements (latching elements) of the retaining ring, on the one hand, and of the covering, on the other hand, engaging in one another. The form-fitting elements may be, for example, projections (tabs) on one of the two subassemblies and associated recesses on the other subassembly.

Further features and advantages of the invention will become clear in the description below of an exemplary embodiment with reference to the figures.

FIGS. 1 to 3 illustrate an airbag module which has a gas bag 3, a gas generator 2 for inflating the gas bag 3, a covering 4 and a valve V for letting gas out of the gas bag 3 and which is fitted on a support 1 in the form of a support plate.

The support plate 1 is formed by a flat, annular support body 10 which encloses an essentially circular cut-out 11 and has fastening openings 12 through which a fastening mechanism 13 in the form of fastening screws engage in order to fasten a retaining ring 5.

The gas generator 2 is formed by a generator cup 20 and has a flange 21, which protrudes from the generator cup 20, with fastening points 22 through which the gas generator 2 can be fastened to the basic body 6 of the valve V by fastening elements 22 in the form of fastening screws.

The gas bag 3 is accommodated as a folded gas bag package radially next to the outer wall, encircling in a circular manner, of the generator cup 20 of the gas generator 2 and has a gas bag layer extending above the generator cup 20.

The open blow-in mouth 30 of the gas bag 3 is fixed at its edge by a reinforcing element 31 in the form of a reinforcing ring in a circular ring-shaped geometry and extends essentially along the outer circumference of the airbag module, with the result that a large, open cross-sectional area for letting gas out of the gas bag through the blow-in mouth 30 is produced. The gas generator 2 also protrudes through the gas bag by mechanism of its generator cup 20 into the interior of the folded gas bag 3.

The retaining ring encircling on the outer circumference of the airbag module furthermore has outwardly protruding tabs 53 which interact with clearances 43 on a lateral wall 41 of the covering 4, which lateral wall protrudes from a base surface 40, in order to position the covering 4 on the airbag module in a defined manner. In order to fasten the covering 4 to the airbag module, latching elements 52 protrude outward from wall 50 of the retaining ring 5 in the form of projections which engage in associated latching openings 42 of the lateral wall 41 of the covering 4.

The retaining ring encircling on the outer circumference of the airbag module furthermore has outwardly protruding tabs 53 which interact with clearances 43 on a lateral wall 41 of the covering 4, which lateral wall protrudes from a base surface 40, in order to position the covering 4 on the airbag module in a defined manner. In order to fasten the covering 4 to the airbag module, latching elements 52 protrude outward from the retaining ring 5 in the form of projections which engage in associated latching openings 42 of the lateral wall 41 of the covering 4.

A valve V which is formed by a disk-shaped basic body 6 and an actuating element in the form of an actuating disk 7 and, in the opened state, permits gas to exit from the gas bag 3 (through its blow-in mouth 30) is arranged in front of the blow-in mouth 30 of the gas bag 3 and within the space engaged around by the retaining ring 5 on that side (lower side) of the folded gas bag 3 which faces away from the base surface 40 of the covering 4.

The disk-shaped valve basic body 6 is formed by a flat, annular body 60 which is designed as a plastic molded part, surrounds a circular recess 61 and is provided along its circumference U with enough openings 65 and intermediate segments 66 in an alternating manner.

Projections 62, 63 protrude inward in each case from the outer and inner edge of the annular body 60 and serve as an installation aid during the assembly of the disk-shaped valve basic body 6 with the associated actuating element 7 in the form of an actuating disk.

The actuating disk 7 is likewise formed by a flat, annular basic body 70 which surrounds a circular clearance 71 and is provided with through openings 75 and intermediate segments 76 in an alternating manner in the circumferential direction U. The through openings 65, 75 of the valve basic body 6, on the one hand, and of the actuating disk 7, on the other hand, have essentially identical dimensions, with the result that they can overlap in order to form outflow openings. On the other hand, the intermediate segments 66, 76 of the valve basic body 6, on the one hand, and of the actuating disk 7, on the other hand, are configured so that they can completely overlap and close the through openings 75, 65 of the respectively other of these two valve subassemblies 6, 7, with the result that the valve is blocked with regard to letting gas through.

The circular ring-shaped cut-outs 61, 71 of the valve basic body 6 and of the actuating disk 7 are passed through by the cup 20 of the gas generator 2 and, as a result, are sealed so that they do not permit gas to flow out of the gas bag 3.

The flat, annular body 70 of the actuating element 7 is preferably composed of metal, for example high-grade steel plate, and has depressions 72, 73 in each case on its inner and outer edges in the form of indentations which correspond with the projections 62, 63 protruding inward on the inner and outer edges of the valve basic body 6.

A receptacle 8 with a hollow-cylindrical receiving region 80 into which a pyrotechnic unit 9 can be inserted is integrally formed on the valve basic body 6. A union nut 84 is provided for fixing the pyrotechnic unit 9 in the receiving region 80. The pyrotechnic unit 9 serves to pyrotechnically generate gas when ignited, with the gas which can be released by the pyrotechnic unit 9 being assigned a pressure space 81 on the valve basic body 6, which pressure space is formed by a section of the hollow-cylindrical receiving region 80 that is not filled by the pyrotechnic unit 9.

The pressure space 81 is predominantly bounded laterally by the inner wall 82 of the hollow-cylindrical receiving region 80 of the valve basic body 6 and on one side partially by a pressure application surface 77b of the actuating disk 7 running perpendicularly to the plane along which the valve basic body 6 and the actuating disk 7 extend. Accordingly, the lateral boundary of the pressure space 81 is predominantly formed by the inner wall 82 of the hollow-cylindrical receptacle 80, which is integrally formed on the valve basic body 6, and to a smaller part by the pressure application surface 77b of the actuating disk 7. The top surfaces of the pressure space 81 are bounded on one side by the pyrotechnic unit 9 with sealing by the union nut 84, and on the other side, which faces the gas bag, by a covering 85 fixed to the valve basic body 6. In order to fix the pressure space covering 85 to the valve basic body 6, use is made of pins 86 which protrude from the pressure space covering 85 and which are assigned fastening openings 68 in the form of through holes on the valve basic body 6.

In interaction with the pressure space 81, the pyrotechnic unit 9 forms a triggering mechanism for actuating the valve V, as will be explained in more detail below in the description of the function of the airbag module according to the invention.

Next to the pressure space 81 and partially bounding the space, a separating web 67 runs on the annular body 60 of the valve basic body 6 in the radial direction and forms a stop 67a for which in turn a counterstop 77a is arranged on the annular body 70 of the actuating disk 7. This counterstop 77a lies opposite the pressure application surface 77b of the actuating disk 7 and, together with the pressure application surface, bounds an interruption 77 in the annular body 70 of the actuating disk 7.

The valve V is fixed to the airbag module by the valve basic body 6 and the associated actuating disk 7 being accommodated between the support plate 1 and the retaining ring 5, which is connected thereto, with the interposition of the reinforcing ring 31 of the gas bag 3. The retaining ring 5 fastened to the support plate 1 therefore contributes to the fastening of a plurality of further components of the airbag module, namely the gas bag 3, the covering 4 and the valve V. By contrast, the gas generator 2 is fastened to the valve basic body 6 independently of the retaining ring 5.

The installation of the valve V by assembly of the valve basic body 6, the actuating disk 7 and the covering 85 will now be described with reference to FIGS. 4 to 6, with the triggering mechanism 9, which is assigned to the valve V, in the form of a pyrotechnic unit being pre-fitted in the hollow-cylindrical receiving region 80 of the receptacle 8 integrally formed on the valve basic body 6.

According to FIG. 4, for the installation of the valve V first of all the actuating disk 7 is pushed onto the valve basic body 6, to be precise along a direction essentially perpendicularly to the plane of extent, along which the disk-shaped valve basic body 6 and the actuating disk 7 extend in the fitted state. In this case, the projections 62, 63 protruding inward from the outer and inner edges of the valve basic body 6, on the one hand, and the depressions 72, 73 provided on the inner and outer edges of the actuating disk 7, on the other hand, serve as installation aids by the actuating disk 7 being placed onto the valve basic body 6 so that the projections 62, 63 and the depressions 72, 73 each come into engagement with one another in pairs. After the actuating disk 7 is completely inserted into the valve basic body 6, as illustrated in FIG. 4, the inwardly protruding projections 62, 63 of the valve basic body 6 engage over the annular body 70 of the actuating disk 7, with the result that the disk is mounted on or in the valve basic body 6 and can be guided there.

In the state shown in FIG. 4, directly after the actuating disk 7 is placed on and inserted, with the projections 62, 63 of the valve basic body 6 still being situated above the depressions 72, 73 of the actuating disk 7, the through openings 65, 75 of the valve basic body 6, on the one hand, and of the actuating disk 7, on the other hand, overlap. This corresponds to the opened state of the valve V formed by the valve basic body 6 and the actuating disk 7.

The installation is continued by the actuating disk 7 first of all being rotated with respect to the basic body 6 along the circumferential direction U so that the through openings 65, 75 of the valve basic body 6, on the one hand, and of the actuating disk 7, on the other hand, are now overlapped by the intermediate segments 76, 66 of the respectively other of these two subassemblies 6, 7. This corresponds to the closed state of the valve V, in which no discharge openings through which gas could flow out are formed, corresponding to FIG. 5.

In this position, the inwardly protruding projections 62, 63 of the valve basic body 6 engage over the intermediate segments 76 of the actuating disk 7, so that the actuating disk 7 is reliably retained on the valve basic body 6. This involves a form-fitting connection, caused by the inwardly protruding projections 62, 63 of the valve basic body 6 engaging over the intermediate segments 76 of the actuating disk 7. Since the projections 62, 63 here each protrude inward both from the inner edge and from the outer edge of the valve basic body 6, the intermediate segments 76 of the actuating disk 7 are engaged over both on their respective, radially outer edge and on their radially inner edge by respective projections 62 and 63 of the valve basic body 6. It is thereby ensured, during subsequent operation of the valve V, upon a rotational movement of the actuating disk 7 with respect to the valve basic body 6, which rotational movement is triggered by the pyrotechnic unit 9, that the actuating disk 7 is reliably guided on the valve basic body 6.

Figure 6:
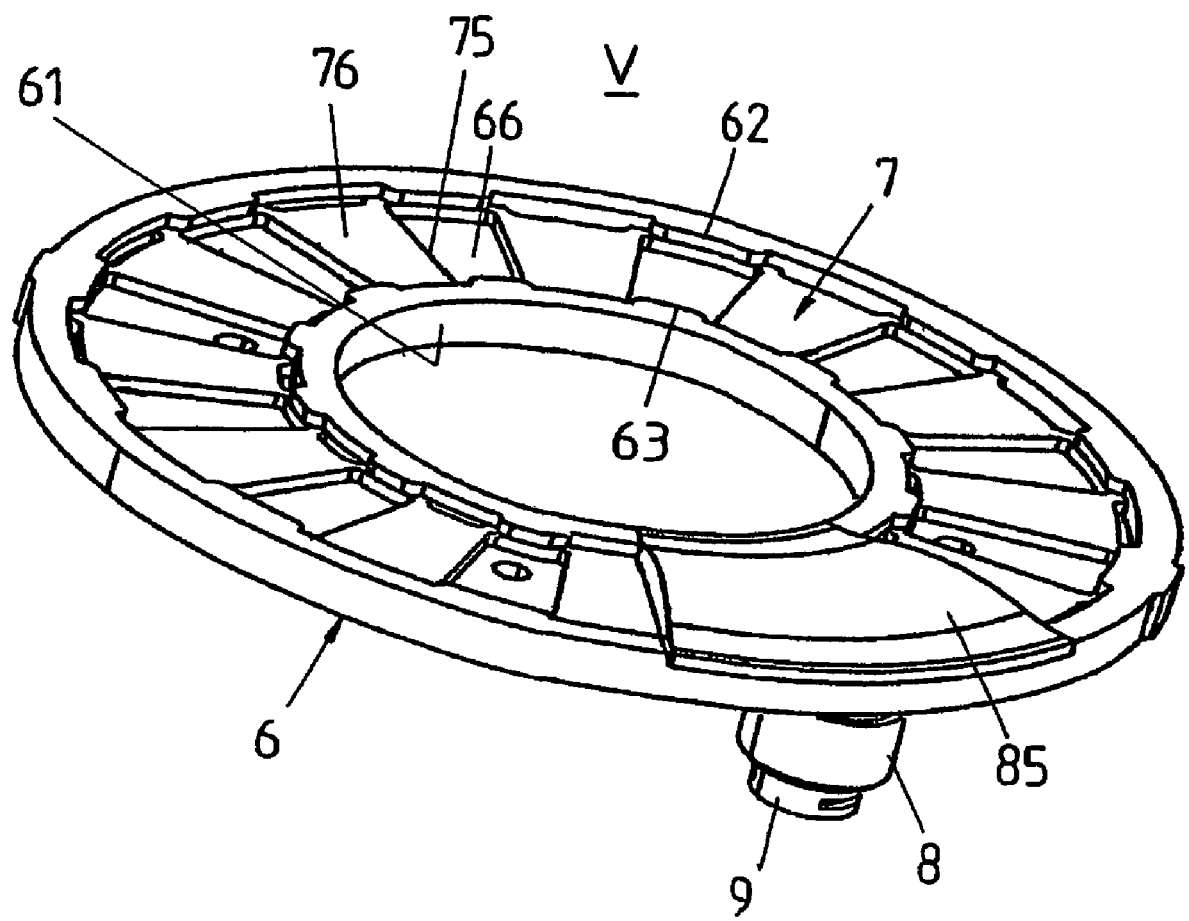
FIG. 6 shows a third step in the installation of the valve from FIG. 3.

Finally, according to FIG. 6, the pressure space covering 85 is placed onto the valve subassembly V, which comprises the valve basic body 6 and the actuating disk 7, so that the fastening pins 86, which protrude downward from the pressure space covering 85, engage in associated fastening openings 68 of the valve basic body 6. The fastening pins 86 are then riveted in the respectively associated fastening opening 68 from the side facing away from the pressure space covering 85 and are thereby finally fixed, compare FIG. 6.

The function of the valve arrangement V during operation of the airbag device illustrated in FIGS. 1 to 6 will now be described with additional reference to FIGS. 7 and 8.

If, due to an accident, a sudden, sharp deceleration (negative acceleration) of a vehicle equipped with an airbag module of the type illustrated in FIGS. 1 to 3 occurs, then the gas generator 2 of the airbag module is triggered by an associated crash sensor and generates gas for inflating the gas bag 3, which is initially still present as a gas bag package. Upon inflation, the gas bag 3 deploys, with the base surface 40 of the covering 4 of the airbag module tearing open in a defined manner and releasing an opening for the deploying gas bag 3. For this purpose, predetermined breaking lines (tearing lines)

are provided in a known manner in the base surface 40 of the covering 4. The gas bag 3 deploys through the released opening along a specified direction in front of the body of a vehicle occupant to be protected.

Depending on the current position, the size, the weight, the relative movement with respect to the vehicle interior and further parameters which characterize the vehicle occupant to be protected, it may be advantageous for optimum protection of the particular occupant to let out some of the gas flowing into the gas bag from the gas generator 2. The valve V, which can be actuated by the pyrotechnic unit 9, is provided for this purpose. The pyrotechnic unit 9 is in turn connected in a known manner to sensors with which the parameters serving to control the valve V, such as, for example, the size and the weight of a vehicle occupant and the position thereof, can be detected.

If the pyrotechnic unit 9 serving as a triggering mechanism for the valve V is ignited by starting signals of the associated sensors, then a gas is pyrotechnically generated and released, the gas leading to an increase in pressure in the pressure space 81 of the valve basic body 6. At this time, the valve V is still in the starting position, which can be seen with reference to FIG. 7, in which the intermediate segments 66, 76 of the valve basic body 6 and of the actuating disk 7 close the through openings 75, 65 of the respectively other of the two valve subassemblies 6, 7. In this state, according to FIG. 7, in which the pressure space covering 85 is not illustrated for the purpose of making it easier to see the details of the pressure space 81, the pressure application surface 77b of the actuating disk 7 together with the inner wall 82 of the receiving region 80 integrally formed on the valve basic body 6 forms the inner side wall of the pressure space 81. Under the action of the pressure which is generated in the pressure space 81 and acts on the pressure application surface 77b of the actuating disk 7, the actuating disk 7 rotates relative to the valve basic body 6 (counterclockwise). This is made possible by the moveable guiding of the actuating disk 7 on the valve basic body 6 by the projections 62, 63 protruding inward there from the outer and inner edges.

Accordingly, the valve basic body 6 (including the pressure space covering 85) and the actuating disk 7 form a piston/cylinder unit with the actuating disk 7 as rotary piston.

The possible rotational movement of the actuating disk 7 with respect to the valve basic body 6 is restricted by the stop surface (counterstop 77a) of the actuating disk 7, which stop surface lies opposite the pressure application surface 77b and, owing to the rotational movement of the actuating disk 7 with respect to the valve basic body 6, enters into engagement with the stop 67a provided on the radially extending separating web 67 of the valve basic body 6, compare FIG. 8 (in which the pressure space covering 85 is likewise not illustrated).

By mechanism of this restricted rotational movement, the actuating disk 7 has taken up a relative position with respect to the valve basic body 6, in which, according to FIG. 8, the through openings 65, 75 of the valve basic body 6 and of the actuating disk 7 overlap, so that they form discharge openings through which gas can flow out of the gas bag 3 in a direction away from the occupant to be protected (opposite to the direction of deployment of the gas bag 3 through an opening in the base surface 40 of the covering 4).

Since, during the restricted rotational movement of the actuating disk 7 with respect to the valve basic body 6, that stop surface of the actuating disk 7, which forms the counterstop 71a, increasingly comes nearer the associated stop 67a on the radial separating web 67 of the valve basic body, a rise in pressure occurs in the region between the two stops 67a, 77a; this is because the space bounded by these two stops 67a, 77a is additionally closed downward by the annular body 60 of the valve basic body 6 and upward by the pressure space covering 85. In order not to obstruct the movement of the actuating disk 7 until the two stops 67a, 77a meet, a pressure relief opening 69 is therefore provided before the stop 67a on the radial separating web 67 of the valve basic body 6.

The distance between the pressure application surface 77b of the actuating disk 7 and the opposite stop surface which forms the counterstop 77a, which surfaces together bound an interruption 77 of the actuating disk 7 on both sides, is selected in the circumferential direction U so that at the end of the relative movement of the actuating disk 7 with respect to the valve basic body 6 (which is determined by the two stops 67a, 77a meeting on the valve basic body 6 and on the actuating disk 7), the through openings 65, 75 on the valve basic body 6 and actuating disk 7 completely overlap and therefore a maximum outflow cross section is available for gas flowing out of the gas bag 3.

Figure 9:
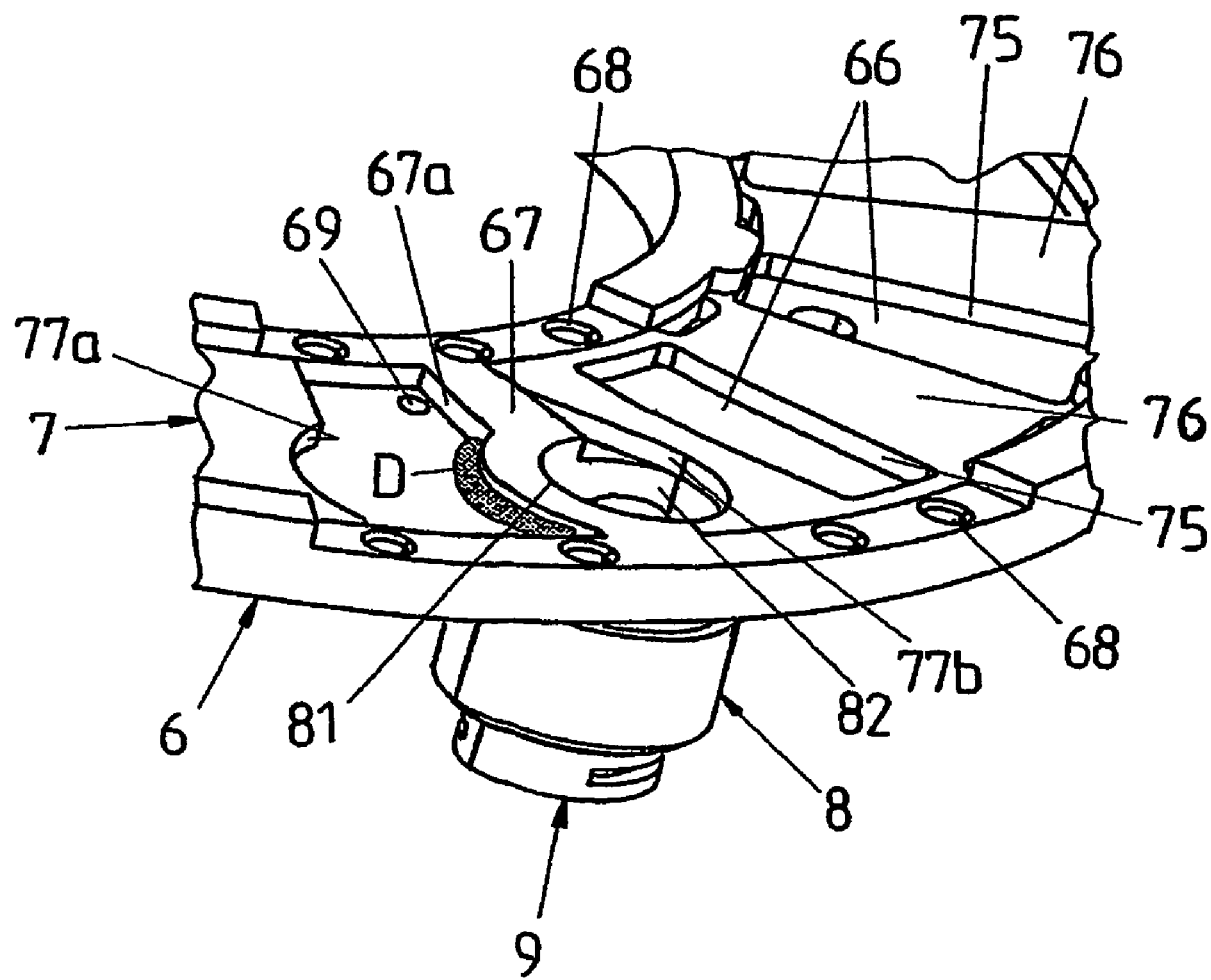
FIG. 9 shows a detail of a modification of the valve from FIG. 3.

FIG. 9 shows a development of the valve V in the region of the pressure space 81. The starting point for the development is the problem that, when the actuating disk 7 impacts with its counterstop 77a against the associated stop 67a of the valve basic body 6 at high speed (caused by the pressure generated by mechanism of the pyrotechnic unit), a resetting movement of the actuating disk 7 could be caused, the resetting movement having the tendency to again cancel the overlap of the through openings 65, 75 of the valve basic body 6 and of the actuating disk 7 and to again at least partially close the corresponding through openings 65, 75.

For this reason, in the case of the development, shown in FIG. 9, of the valve arrangement V according to embodiments of the invention, a deformation element D is arranged in front of the basic-body stop 67a, the deformation element being deformed before the actuating disk 7 impacts in the region of its stop surface 77a against the associated stop 67a of the valve basic body 6 and thereby braking the movement of the actuating disk 7.

The deformation element D may be, for example, a wire which is deformed upon encountering the counterstop 77a of the actuating disk 7 and the downwardly angled ends of which are fitted into associated holes of the valve basic body 6.

The priority application DE 103 61 887.2 filed Dec. 19, 2003, including the specification, claims and figures, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag device for a motor vehicle, comprising:
   an inflatable gas bag;
   a gas generator for inflating the gas bag;
   a valve through which gas is released out of the bag, wherein the valve includes a basic body and a moveable actuating element that can be actuated in order to open the valve; and
   a triggering mechanism for actuating the actuating element by generating pressure, wherein the triggering mechanism includes a sensor-controlled, pyrotechnic unit that releases a gas in order to actuate the actuating element;

wherein the airbag device is configured so that the released gas passes into a pressure space of the valve to act directly on a pressure application surface of the actuating element;

wherein the pressure space is located in an interruption of the actuating element, the interruption being bounded on one side by an actuating-element stop and on the other side by the pressure application surface, so that the actuating element moves in response to the action of the triggering mechanism, wherein the airbag device is configured so that the movement is ended by the actuating-element stop striking against a basic-body stop.

2. The airbag device as claimed in claim 1, wherein the pressure space is closed on all sides in a gastight manner.

3. The airbag device as claimed in claim 1, wherein the basic body and the actuating element are each provided with through openings, and the actuating element can be positioned, by actuation of the triggering mechanism, relative to the basic body so that the through openings of the basic body and of the actuating element at least partially cover each other and the valve is opened in order to release gas from the bag.

4. The airbag device as claimed in claim 3, wherein before actuation of the actuating element by the triggering mechanism, the through openings of the basic body are covered by the actuating element, so that the valve is closed.

5. The airbag device as claimed in claim 1, wherein the basic body and the actuating element are disk-shaped.

6. The airbag device as claimed in claim 1, wherein the basic body and the actuating element have mutually assigned projections and indentations which serve as an installation aid during the assembly of the valve from basic body and actuating element.

7. The airbag device as claimed in claim 6, wherein projections of the basic body serve to guide the actuating element on the basic body.

8. The airbag device as claimed in claim 1, wherein a deformation element is arranged in front of one of the stops of the basic body and activating element in order to brake the actuating element before the actuating element meets the stops, wherein the deformation element is configured to deform during braking of the actuating element.

9. The airbag device as claimed in claim 1, wherein the pressure application surface of the actuating element extends essentially perpendicularly to the direction of movement of the actuating element under the action of the gases released by the triggering mechanism.

* * * * *